United States Patent Office 3,408,257
Patented Oct. 29, 1968

3,408,257
METHOD FOR THE PRODUCTION AND ISOLATION OF 5-PHOSPHO-D-RIBOSYL-1-PYROPHOSPHATE, D-RIBOSE-1,5-DIPHOSPHATE AND D-RIBOSE-5-PHOSPHATE
Yoshiaki Kawamori, Masahiko Matsuura, Takeshi Saito, and Yoshinobu Miyamura, Shizuoka-ken, Japan, assignors to Kyowa Hakko Koyo Co., Ltd., Chiyoda-ku, Tokyo, Japan, a corporation of Japan
No Drawing. Filed July 19, 1965, Ser. No. 473,191
Claims priority, application Japan, July 30, 1964, 39/42,859
3 Claims. (Cl. 195—31)

ABSTRACT OF THE DISCLOSURE

The present disclosure is directed to a method of preparing and recovering D-ribose phosphates such as 5-phospho-D-ribosyl-1-pyrophosphate (PRPP), D-ribose-1, 5-diphosphate (PRP) and D-ribose-5-phosphate (R–5–P) which comprises cultering a D-ribose phosphate-producing microorganism in an aqueous nutrient culture medium containing about 0.2 to 2.0% by weight (as phospho radical) of phosphate and about 0.01 to 0.2% by weight (as magnesium ion) of magnesium salt, accumulating the aforesaid phosphates in the fermentation liquor and in the cells of the cultured microorganism, separating the fermentation liquid from the remaining fermentation products and subjecting said liquid to fractional chromatography to separately recover said 5-phospho-D-ribosyl-1-pyrophosphate, D-ribose-1,5-dyphosphate and D-ribose-5-phosphate therefrom. The present process is not specific to any particular microorganisms or strains.

The present invention is directed to a process for the recovery of D-ribose phosphates—namely, 5-phospho-D-ribosyl-1-pyrophosphate (PRPP), D - ribose - 1,5 - diphosphate (PRP) and D-ribose-5-phosphate (R–5–P)—from the fermentation liquor resulting from the cultivation of a microorganism in an appropriate culture medium and under suitable cluture conditions.

Ordinary processes hitherto in use for the production of D-ribose-5-phosphate from nucleic acid-related compounds depend upon decomposition, and hence are rather uneconomical. The production of R–5–P by a fermentation method is known, but the possibility of producing PRPP and PRP through direct fermentation with the aid of microorganisms has not heretofore been reported. In fact, there is no known industrial process for the production of PRPP and PRP. The present invention supplies such a process. Since this invention not only produces and makes possible the recovery of PRPP and PRP but also produces and makes possible the recovery of R–5–P by a microbiological fermentation and an associated recovery process, the entire process is rendered economically and industrially very feasible.

These three D-ribose phosphates are useful for biochemical reagents and nucleotide producing materials.

The present invention is based upon the observation that by subjecting the fermentation liquor, resulting from the culturing of a microorganism in an appropriate nutrient medium containing added magnesium salts and phosphrous salts (phosphates), to fractional chromatography, remarkable yields of all three D-ribose phosphates—PRPP, PRP and R–5–P—are obtained. For reference, the chemical structures of PRPP, PRP and R–5–P are shown as follows:

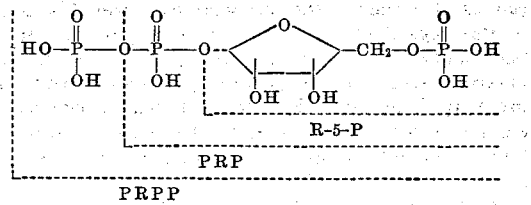

The production ratio of the said three D-ribose phosphates varies in accordance with the culture conditions, the culturing period and the species of microorganism. As to the latter, it is found that the present invention is not specific to any particular microorganism or strains, and that the invention is in fact applicable to strains of microorganisms belonging to such various genera as Bacillus, Escherichia, Staphylococcus, Pseudomonas, Flavobacterium, Aerobacter, Leuconostos, Brevibacterium, Micrococcus, Corynebacterium, Arthrobacter, Saccharomyces, Candida, Torula, Cryptocóccus, Torulaspora, Mucor, Rhizopus, Penicillium, Paecilomyces, Gibberella, Trichoderma, Streptomyces, Micromonospora, and Eremothecium. Accordingly, the invention cannot be restricted to any particular microorganisms or to strains of any specific bacteriological classification. The invention is also applicable to nutrient-requiring mutants obtained by various mutation-inductive treatments.

The culture medium for use according to the present invention can be any medium which contains suitable amounts of carbon sources such as saccharides or other carbon sources (for example, glucose, sucrose, starch, starch hydrolysates, molasses, gluconates, acetates, etc.), nitrogen sources (for example, such inorganic nitrogen sources as ammonium salts and nitrates, and such organic nitrogen sources as urea, amino acids, peptides and preparations containing these, including peptone, yeast extract, meats extract, Casamino acid, fish solubles and the like), and inorganic compounds (for example, phosphates including potassium phosphate and ammonium phosphate; magnesium salts such as magnesium chloride, and other salts containing elements indispensible to the culturing of microorganisms, such as salts of potassium, calcium, iron, manganese, zinc copper, boron and molybdenum).

It is thus seen that subject to special conditions hereinafter set forth, the culture mediums are essentially conventional culture mediums for the culturing of microorganisms. In the case of nutrient-requiring strains, the necessary nutrient materials must of course be added to media for the growth of these mutants.

Characteristic of the culture medium compositions used according to this invention is that phosphates and magnesium salts, among the said inorganic compounds, are added to the culture medium in a higher concentration than the usual concentration in fermentation media for general microorganisms; in other words, the phosphates and magnesium salts should be added in concentrations of 0.2 to 2.0%, and 0.01 to 0.2% (as magnesium ion), respectively, the said percentages being by weight when, depending upon the species of bacteria, the growth of bacterium is suppressed owing to a high concentration of these ingredients in the initial culture medium, the ingredients may be added in small amounts in the course of the fermentation.

The fermentation is carried out at a culture temperature of 20° to 40° C. under aerobic conditions such as shaking culture and submerged culture under aerobic-agitation. Culture for 2 to 7 days leads to an accumulation of striking amounts of PRPP in the culture liquor and in the cells of the cultured microorganisms, PRP and R–5–P being accumulated at the same time.

After the culture has been completed, the PRPP, PRP and R–5–P can be individually recovered from the culture liquor and the said cells by fractional chromatography as illustrated in the following examples. Use is made in this regard of a column of an appropriate strongly basic anion exchange resin (formate-type, acetate-type or cl-type), such e.g. as Dowex-1, Amberlite-IRA, Duolite-A or Diaion-SA. Elution is thereafter effected with eluants which separately elute the objective substances. Suitable eluants comprise, for example, formic acid-sodium or ammonium formate, acetic acid-sodium or ammonium acetate, or hydrochloric acid-sodium or ammonium chloride.

The following examples set forth presently preferred illustrative embodiments of the invention and are not intended to be limitative of the latter. Percentages in the examples are by weight. ($\gamma$/ml. means gammas per milliliters; $\gamma$/l means gammas per liter; mg./ml. means milligrams per milliliter.)

EXAMPLE 1

*Brevibacterium ammoniagenes* KY-3454 (ATCC 6872) as the seed was incubated in 300 milliliters of an aqueous culture medium containing 2% of glucose, 1% of peptone, 1% of meat extract, 0.25% of NaCl, and 0.2% urea in a 2-liter conical flask, which was sterilized, and maintained at a pH valve of 7.5 at 28° C. for 24 hours.

The resulting culture was inoculated into the fermentation medium in the ratio of 10% by volume relative to the latter. Forty milliliters of the fermentation medium was placed in a 500-milliliter Sakaguchi's flask and used after sterilization.

Using the fermentation medium having the composition described below, shaking culture was conducted at 28° C.

The fermentation medium was as follows:

| | | |
|---|---|---|
| Glucose | pct__ | 12 |
| Urea | pct__ | 0.6 |
| $KH_2PO_4$ | pct__ | 1.2 |
| $K_2HPO_4$ | pct__ | 1.2 |
| β-Alanine | $\gamma$/ml__ | 5 |
| $MgSO_4 \cdot 7H_2O$ | pct__ | 0.5 |
| Biotin | $\gamma$/liter__ | 30 |
| $CaCl_2 \cdot 2H_2O$ | pct__ | 0.01 |
| Meat extract | pct__ | 0.2 |
| $FeSO_4 \cdot 7H_2O$ | pct__ | 0.001 |

In this way, in the fermentation liquor cultured for 72 hours, R–5–P, PRP and PRPP were accumulated in a yield of 15.4 mg./ml. calculated as R–5–P. In addition, the accumulation of these phosphates was observed also in the cells of the cultured microorganisms.

To 100 milliliters of the filtrate obtained by removing the said cells from the former fermentation liquor, calcium hydroxide was added and the deposited inorganic phosphorus compounds were removed by centrifugation. The resulting supernatant liquid was passed through a column of Dowex-1 (formic acid type), the ribose phosphates being absorbed and then eluted with 0.2 molar-, 0.4 molar- and finally 0.5 molar- sodium formate buffer solutions (pH 5.0) in order.

R–5–P, and both of PRP and PRPP were contained in the 0.2 molar-sodium formate effluent and in the 0.5 molar- sodium formate effluent, respectively. Each fraction was passed through a column of Diaion SK No. 1 (H type), neutralized to pH 7.0, and then concentrated under reduced pressure.

The concentrate was treated with a small amount of carbon powder and the pH thereof was adjusted to 8.3 with sodium hydroxide. To the concentrate treated thus, barium acetate (20%) in an amount 1.2 times the calculated amount and alcohol (four-fold) were added to deposit the corresponding salts. The precipitates were dried under diminished pressure to afford R–5–P, PRP, and PRPP in the yields of 311 milligrams, 250 milligrams, and 29 grams, respectively, calculated as the individual anhydrous barium salts.

EXAMPLE 2

Using *Micrococcus glutamicus* ATCC 14995 as the seed, the seed cultivation was carried out in the same way as described precedingly and the resulting culture was inoculated into the fermentation medium in the ratio of 10% by volume relative to the latter. A fermentation medium having the following composition was employed:

| | | |
|---|---|---|
| Sucrose | pct__ | 15 |
| $(NH_4)_2SO_4$ | pct__ | 0.2 |
| $KH_2PO_4$ | pct__ | 0.8 |
| $K_2HPO_4$ | pct__ | 0.8 |
| $MgSO_4 \cdot 7H_2O$ | pct__ | 6.6 |
| Biotin | $\gamma$/liter__ | 30 |
| Peptone | pct__ | 0.2 |
| $FeSO_4 \cdot 7H_2O$ | pct__ | 0.002 | pH: Adjusted to 7.3 before sterilization.

The fermentation was carried out by use of 3 liters of the cultured medium, which was sterilized in a 5-liter jar fermentor, by submerged culture under aeration-agitation. During the course of the culture, the pH was adjusted to 7.0. When the incubation was conducted at 34° C. for 48 hours, PRPP, PRP and R–5–P were accumulated in the fermentation liquor in a yield of 10.2 mg./ml., calculated as R–5–P. In addition, such accumulation was found also in the cells of the cultivated microorganism.

From 2 liters of the fermentation liquor, R–5–P, PRP and PRPP were fractionated by the same procedure as in Example 1 and separated in yields of 1.1 grams, 4.2 grams, and 41.2 grams, respectively, calculated as the individual anhydrous barium salts.

EXAMPLE 3

When by using the following fermentation medium, various kinds of microorganisms were cultured under the same conditions as in Example 1 for 48 hours, 96 hours, and 6 days in the cases of bacterium, yeast and actinomyces, and mold, respectively, PRPP, PRP, and R–5–P were accumulated in the amounts listed in Table 1.

Composition of fermentation medium:

| | Percent | | | |
|---|---|---|---|---|
| | Bacterium | Yeast | Actinomyces | Mold |
| Glucose | 10 | 10 | 10 | 10 |
| Urea | 0.4 | | | |
| $NH_4Cl$ | | 0.5 | 0.5 | 0.5 |
| $K_2HPO_4$ | 0.2 | | | |
| $KH_2PO_4$ | 1.0 | 1.0 | 1.0 | 1.0 |
| $MgSO_4 \cdot 7H_2O$ | 1.0 | 1.0 | 1.0 | 1.0 |
| Yeast extract | 0.6 | 0.6 | 0.6 | 0.6 |
| Peoptone | 0.4 | 0.4 | 0.4 | 0.4 |
| $FeSO_4 \cdot 7H_2O$ | 0.2 | 0.2 | 0.2 | 0.2 |
| pH before sterilization | 0.002 | 0.002 | 0.002 | 0.002 |
| | 7.8 | 6.3 | 7.3 | 5.3 |

TABLE 1

| Strain used | Mg./ml. | | |
|---|---|---|---|
| | PRPP | PRP | R-5-P |
| Aerobacter aerogenes ATCC 14304 | 7.0 | 1.1 | 0.8 |
| Alcaligenes faecalis 3101 | 4.0 | 0.2 | 0.9 |
| Bacillus subtilis ATCC 14618 | 3.2 | 0.0 | 1.2 |
| Bacillus cereus 3305 | 5.1 | 1.0 | 1.0 |
| Bacillus coagulans 3327 | 3.1 | 0.8 | 1.0 |
| Bacillus licheniformis 3342 | 4.2 | 0.9 | 0.5 |
| Cellulomonas flavigena 3492 | 2.0 | 0.2 | 0.8 |
| Corynebacterium tritici 3500 | 5.0 | 0.8 | 0.3 |
| Flavobacterium arborescens 3702 | 6.0 | 0.2 | 0.9 |
| Leuconostoc citrovorum 3551 | 4.2 | 0.2 | 0.8 |
| Micrococcus citreus 3752 | 4.9 | 1.0 | 1.2 |
| Micrococcus caselyticus 3754 | 5.5 | 0.9 | 1.0 |
| Pseudomonas fluorescens 3954 | 7.1 | 0.3 | 0.5 |
| Pseudomonas ovalis 3758 | 6.8 | 0.6 | 0.7 |
| Arthrobacter ureafaciens 3152 | 4.0 | 0.5 | 0.4 |
| Arthrobacter simplex 3151 | 4.8 | 0.5 | 0.6 |
| Escherichia coli ATCC 14621 | 4.9 | 0.0 | 0.7 |
| Brevibacterium ammoniagenes ATCC 15137 | 8.0 | 2.0 | 1.0 |
| Brevibacterium linens 3457 | 6.0 | 1.0 | 0.8 |
| Micrococcus glutamicus ATCC 14305 | 5.0 | 0.5 | 0.2 |
| Bacterium No. 8952 | 9.0 | 1.0 | 0.9 |
| Candida albicans 5021 | 3.0 | 1.0 | 0.5 |
| Candida mycoderma 5024 | 3.2 | 0.8 | 0.4 |
| Cryptococcus neoformans 5052 | 3.1 | 0.6 | 0.8 |
| Cryptococcus albidus 5051 | 8.4 | 0.8 | 0.2 |
| Hansenula anomala 5151 | 2.6 | 0.2 | 0.2 |
| Saccharomyces carlsbergensis 5458 | 2.0 | 0.1 | 1.0 |
| Torula candida 5501 | 4.0 | 0.1 | 1.0 |
| Torula utilis 5502 | 8.9 | 0.9 | 0.8 |
| Torulaspora delbruecki 5551 | 4.0 | 2.0 | 1.0 |
| Willa anomala 5592 | 4.0 | 3.0 | 0.5 |
| Yeast No. 5291 | 7.9 | 2.0 | 1.2 |
| Streptomyces griseus 122 | 5.0 | 0.1 | 0.6 |
| Streptomyces fradiae 163 | 4.2 | 0.3 | 0.5 |
| Streptomyces Sp. K 539 | 4.2 | 2.0 | 0.5 |
| Streptomyces Sp. K 820 | 2.0 | 3.0 | 2.0 |
| Aspergillus japnoicus 21 | 4.0 | 2.0 | 1.0 |
| Penicillium adamentzioides 355 | 2.0 | 3.0 | 1.2 |
| Mucor spinosus 420 | 2.1 | 3.1 | 0.8 |
| Rhizopus nigricans 530 | 8.2 | 2.1 | 1.2 |
| Trichoderma viride 164 | 8.0 | 1.1 | 1.8 |
| Mold No. 1091 | 5.6 | 0.9 | 1.0 |

What is claimed is:

1. A process for the concomitant production and individual recovery of 5-phospho-D-ribosyl-1-pyrophosphate, D-ribose-1,5 - diphosphate and D-ribose-5-phosphate directly by the fermentation of a D-ribose phosphate-producing microorganism, which comprises culturing the said microorganism in a nutrient medium therefore containing 0.2 to 2.0% (as phospho radical) of phosphate and 0.01 to 0.2 (as magnesium ion) of magnesium salt, whereby the aforesaid phosphates are accumulated in the fermentation liquor and in the cells of the cultured microorganism, separating the fermentation liquid from the remaining fermentation products, and subjecting the said liquid to fractional chromatography to separately recover said 5-phospho-D-ribosyl-1-pyrophosphate, D-ribose-1,5-diphosphate and D-ribose-5-phosphate therefrom.

2. In a process for the production of D-ribose phosphates by culturing of a D-ribose phosphate-producing microorganism in a nutrient medium therefore containing 0.2 to 2.0% (as phospho radical) of phosphate and 0.01 to 0.2% (as magnesium ion) of magnesium salt, the improvement comprising the steps of separating the fermentation liquid from the remaining fermentation products, and subjecting the liquid to fractional chromatography to separately recover 5-phospho-D-ribosyl-1-pyrophosphate, D-ribose-1,5-diphosphate and D-ribose-5-phosphate therefrom.

3. The process of claim 1, wherein the microorganism is selected from the group consisting of *Brevibacterium ammoniagenes* KY–3454, ATCC 6872, and *Micrococcus glutamicus* ATCC 14995.

References Cited

UNITED STATES PATENTS 3,303,101  2/1967  Kinoshita et al. _____ 195—31

OTHER REFERENCES

Gunsalus et al.: "The Bacteria III," Academic Press, New York, pp. 296 and 297 (1962), QR41 G78.

ALVIN E. TANENHOLTZ, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,408,257                                                     October 29, 1968

Yoshiaki Kawamori et al.

It is certified that error appears in the above identified patent and that said Letters Patent are hereby corrected as shown below:

In the heading to the printed specification, line 8, "Koyo" should read -- Kogyo --.

Signed and sealed this 17th day of March 1970.

(SEAL)
Attest:

Edward M. Fletcher, Jr.                                  WILLIAM E. SCHUYLER, JR.
Attesting Officer                                                 Commissioner of Patents